UNITED STATES PATENT OFFICE.

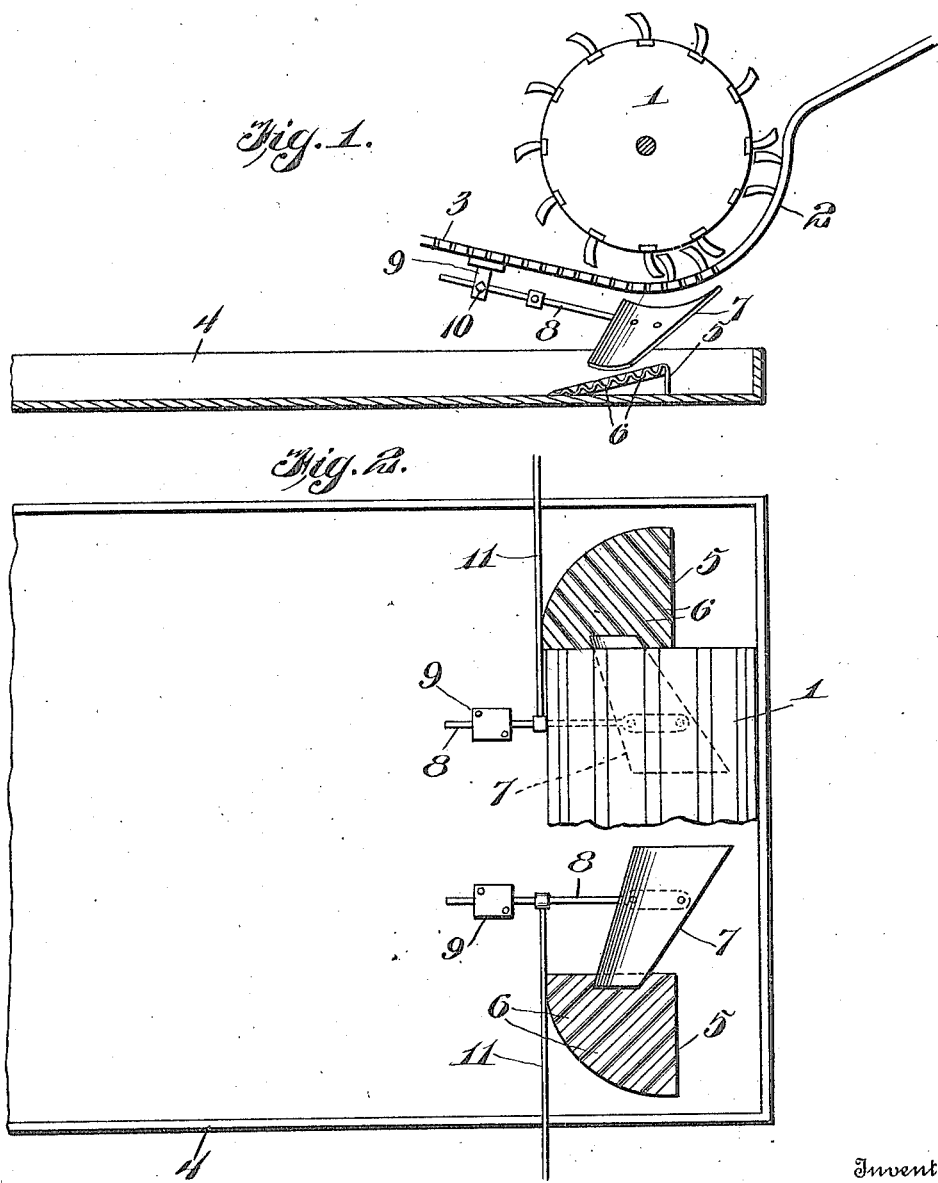

CHARLES W. PETERS, OF MOOSE JAW, SASKATCHEWAN, CANADA.

GRAIN-SEPARATOR.

1,136,973. Specification of Letters Patent. Patented Apr. 27, 1915.

Application filed May 19, 1914. Serial No. 839,600.

*To all whom it may concern:*

Be it known that I, CHARLES W. PETERS, a citizen of Canada, residing at Moose Jaw, in the Province of Saskatchewan and Dominion of Canada, have invented new and useful Improvements in Grain-Separators, of which the following is a specification.

In the operation of threshing machines and separators it frequently happens that the threshing cylinder is of a less length than the width of the grain pan, by means of which the grain is delivered to the separator and as a result the outer portions of the grain pan are not subjected to the same wear as the central portion, hence the middle portion of the grain pan becomes worn or sags and as a result the grain is not delivered to the separator in the best possible manner to avoid choking.

The present invention has for its object to provide means for insuring a uniform distribution of the grain throughout the width of the grain pan irrespective of the length of the threshing cylinder or the delivery of the grain from the threshing mechanism to the pan.

The invention consists of deflectors at the receiving end of the pan to direct the grain outwardly and distributers for receiving the grain from the deflectors and serving to further direct such grain outwardly toward the sides of the pan, such distributers having channels upon their upper surfaces and such channels are inclined so as to direct the grain outwardly and thereby insure a uniform distribution of such grain throughout the width of the grain pan.

The invention consists of the novel features, details of construction and combination of parts, which hereinafter will be more particularly set forth, illustrated and claimed.

In the drawings hereto attached:—Figure 1 is a longitudinal section of a threshing mechanism and grain pan provided with grain distributing means embodying the invention. Fig. 2 is a top plan view, part being broken away.

Corresponding and like parts are referred to in the following description, and indicated in both views of the drawings, by the same reference characters.

The threshing mechanism illustrated is of ordinary construction and comprises a threshing cylinder 1, concave 2 and grate 3.

The numeral 4 designates the usual grain pan arranged below the threshing mechanism and straw rack, the latter being omitted. In the illustration the threshing cylinder is shown of a less length than the width of the grain pan in order to demonstrate the application of the invention. Two distributers 5 are located at the receiving end of the grain pan and near the sides thereof, such distributers being of similar construction and having their upper surfaces inclined and formed with a plurality of channels or grooves 6 which are inclined forwardly and outwardly from the receiving end of the pan. The outer and forward edges of the distributers 5 are made rounding with the result that the distributing grooves or channels 6 terminate at different points in the width of the grain pan thereby insuring a uniform spreading or distribution of the grain throughout the width of the pan when the parts are properly adjusted. The upper surfaces of the distributers incline forwardly and downwardly so as to advance the grain and prevent backward movement thereof. The distributers 5 rest upon the bottom of the grain pan and are secured thereto in any manner and may be constructed of metal or other suitable material. The grooves or channels 6 may be formed in any manner and in the preferable construction consist of flutes or corrugations in the metal plates from which the distributers are formed.

Two deflectors 7 are of similar construction, each being of oblong form and tapering throughout its length, the inner end being the wider. Each of the deflectors is of trough shape and is given a partial twist whereby the grain in its travel over the deflectors is concentrated so as to be delivered upon the required portion of the distributer in a manner to secure the best results. The deflectors besides tapering are arranged at an opposite inclination. A rod 8 is secured to each deflector and passes through a bracket 9 in which it is secured in an adjusted position by means of a set screw 10, said bracket having a swivel connection with the grate 3. A rod 11 is secured at its inner end to the rod 8 and projects laterally so as to be conveniently reached from a side of the machine when it is required to adjust the deflector to obtain the desired result. Adjustment of the deflectors results in delivering the grain to the distributers 5 in a way to insure proper spreading of such grain throughout the width of the grain pan with the result that the chaffer is prevented from clogging in the operation of the thresher and separator.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed as new is:—

In combination with a threshing mechanism including a grate and a coöperating pan, distributers arranged near the receiving ends and sides of the pan, deflectors located above the distributers, means carried by the grate for connecting the former with the latter, and means connected with a portion of the former threshing means and extending exteriorly beyond the opposite sides of the pan, whereby the deflectors may be adjusted to insure a uniform spreading of the grain throughout the width of the pan.

In testimony whereof I affix my signature in presence of two witnesses.

CHARLES W. PETERS.

Witnesses:
W. A. SUTHERLAND,
NORMAN GENTLES.

Copies of this patent may be obtained for five cents each, by addressing the "Commissioner of Patents, Washington, D. C."